US007929065B2

(12) United States Patent
Chan

(10) Patent No.: US 7,929,065 B2

(45) Date of Patent: Apr. 19, 2011

(54) SOLAR ENERGY DRIVEN LCD HANGING-BRAND FOR ADVERTISING

(75) Inventor: Sze Keun Chan, Hong Kong (CN)

(73) Assignee: Sze Keun Chan, Hong Kong (CN)

( * ) Notice: Subject to any disclaimer, the term of this patent is extended or adjusted under 35 U.S.C. 154(b) by 275 days.

(21) Appl. No.: 12/093,444

(22) PCT Filed: Jan. 18, 2006

(86) PCT No.: PCT/CN2006/000071

§ 371 (c)(1), (2), (4) Date: May 12, 2008

(87) PCT Pub. No.: WO2007/056902

PCT Pub. Date: May 24, 2007

(65) Prior Publication Data

US 2008/0284923 A1 Nov. 20, 2008

(30) Foreign Application Priority Data

Nov. 18, 2005 (CN) ............................ 2005 0 132762

(51) Int. Cl.

| | |
|---|---|
| ***G02F 1/13*** | (2006.01) |
| ***A44B 15/00*** | (2006.01) |
| ***G09F 19/00*** | (2006.01) |
| ***G09F 13/00*** | (2006.01) |

(52) U.S. Cl. .................... 349/1; 24/3.6; 40/436; 40/442

(58) Field of Classification Search ................... D3/208, D3/209; 24/3.6; 349/1

See application file for complete search history.

(56) References Cited

U.S. PATENT DOCUMENTS

D399,051 S * 10/1998 Wu ................................ D3/208
2004/0176170 A1 * 9/2004 Eck et al. ........................ 463/43

FOREIGN PATENT DOCUMENTS

WO WO 03067669 A2 * 8/2003

OTHER PUBLICATIONS

Nintendo, Game Boy Advance (™) Instruction Booklet, 2003.*

* cited by examiner

*Primary Examiner* — Mark A Robinson
*Assistant Examiner* — Michael Inadomi
(74) *Attorney, Agent, or Firm* — McNeely, Hare & War LLP; Kevin J. McNeely

(57) ABSTRACT

A LCD hanging-brand using solar energy for advertising, which includes a transparent base, a transparent scaling cover, a PCB board, a picture layer, a LCD sheet, a solar sheet, LEDs, a storage battery and a metal coil. One or more color transparent films can be mounted in the picture layer, and the films can be rotated by a motor or a rotating button. The LCD sheet is transparent when it is not turned on, and the image of the picture layer can be seen through the LCD sheet.

3 Claims, 2 Drawing Sheets

SOLAR ENERGY DRIVEN LCD HANGING-BRAND FOR ADVERTISING

TECHNICAL FIELD

This invention relates to a kind of hanging brand on a key chain, case or bag, particularly a hanging brand using solar energy for advertising.

BACKGROUND ART

At present, hanging brands on key chains, cases or bags are commonly used that are made of transparent material with a picture or trademark logo inside. This is nothing creative and limited in function. While the hanging brand is something which can be used very often during daily life, so it ought to be more functional.

DISCLOSURE OF INVENTION

It is, therefore, an object of the invention, to provide a kind of LCD hanging-brand using solar energy for advertising. Furthermore, with an LED chip inside, it can function as a flashlight.

It is another object of the invention to change a static or single picture by adding a picture rolling function.

These objects are accomplished, in one aspect of the invention, by a transparent base, a transparent scaling cover, a groove with PCB board inside, a picture layer, a LCD sheet, a solar sheet, LEDs, a storage battery and a metal coil. One or more color transparent films can be mounted in the picture layer and the films can be rotated by a motor or a rotating button. With the moving of the film, the advertisement picture can be displayed sequentially. This can be used in education, advertisement, propaganda and illustration.

In another aspect of the invention, solar power is converted to electric power by the solar sheet, storing the power in the battery, supplying the hanging brand.

In another aspect of the invention, the LCD sheet is transparent when it is not turned on and the image of the picture layer can be seen through the LCD sheet. Moreover, the different parts of the LCD can be configured to be powered by presetting, thus the image can be showed part by part in a certain repeated sequence, for example, the center first, then left and then right, so on and so forth.

In another aspect of the invention, it functions as a flashlight. With LEDs mounted inside the transparent base and a button, it can be function as a flashlight and illuminate the picture layer.

In another aspect of the invention, it includes a metal coil. When there are radiowaves around, the metal coil can generate electric power to supply the hanging brand; and with an IC chipset or MCU added, more efficient function can be achieved.

With the said invention, a generic hanging brand is turned into an advertisement or trademark brand and it will be popular for consumers with its colorful content of texts, marks, images or animations. Furthermore, it can add functions such as a clock, thermometer, IC card, etc., depending on the product needs.

For a better understanding of the present invention, the objects, features and advantages of the invention can be illustrated in details through drawing and description of embodiments.

CHART LEGENDS

1. transparent base;
2. groove;
3. PCB board;
4. picture layer;
5. LCD sheet;
6. solar sheet;
7. scaling cover;
8. LEDs;
9. button;
10. storage battery;
11. hanging hole;
12. metal coil;
41. roller; and
42. rotating button.

BEST MODE FOR CARRYING OUT THE INVENTION

Figure 1:
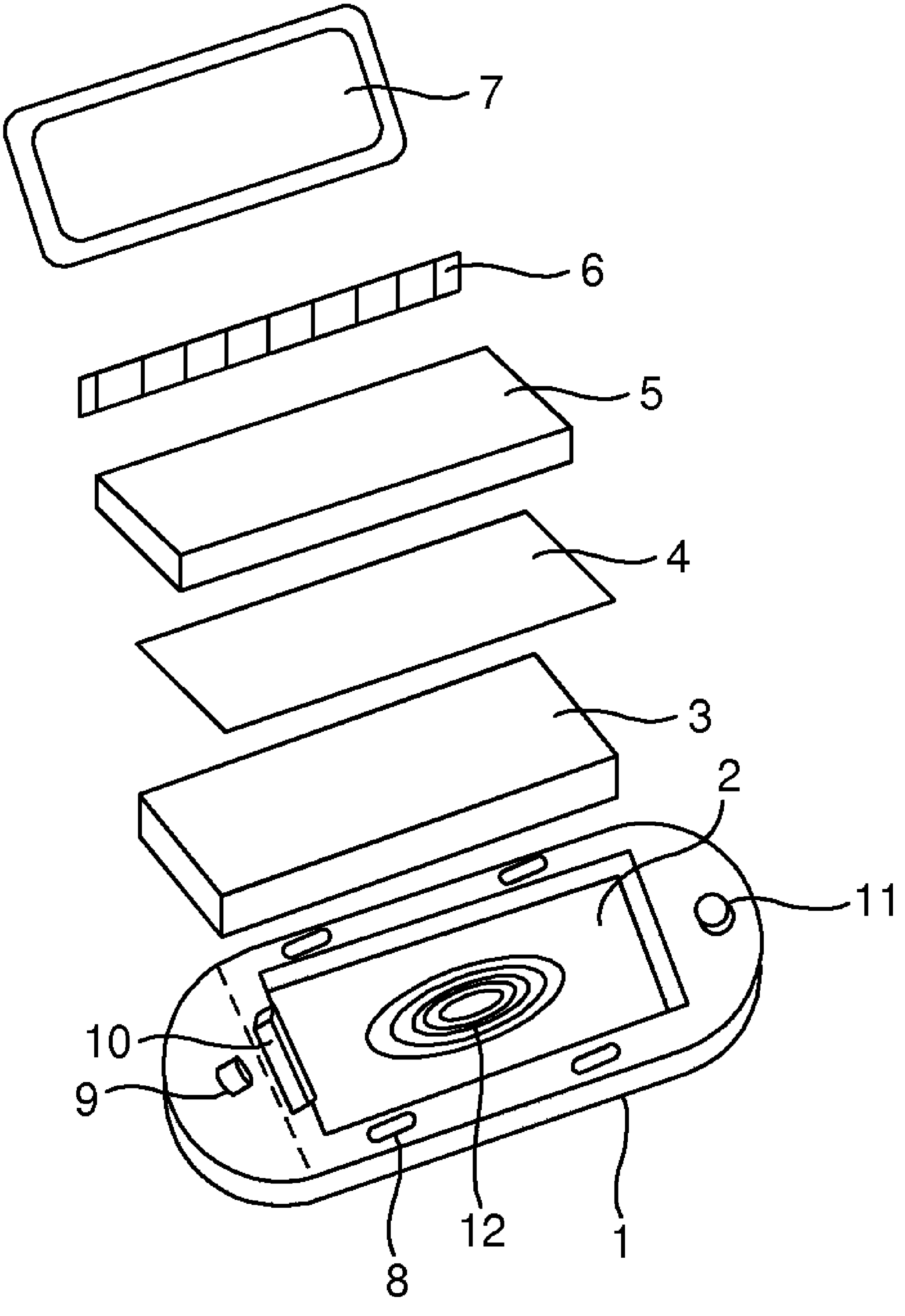
FIG. 1 is a structure chart of one preferred invention embodiment.

As shown in FIG. 1, the invention is composed of a transparent base 1, a hanging hole 11, a transparent scaling cover 7, a groove 2 with a PCB board 3 inside, a transparent base 1, a picture layer 4, a LCD sheet 5, a solar sheet 6, LEDs 8, and a storage battery 10. A color transparent film can be placed in the picture layer 4 and the image on the film can be educational material, advertisement or specific trademark figures.

The LCD sheet 5 is transparent and the different parts of the LCD sheet 5 can be configured to be powered by pre-setting, thus the a partial image can be shown in a certain repeated sequence, for example, the center first, then left and then right, so on and so forth. When the power is off, the color image in the picture layer 4 can be seen through the LCD sheet 5.

The solar sheet 6 receives light turning it into electric power and storing the power in the storage battery 10. The power can supply the hanging brand.

The LEDs 8 are mounted in the transparent base 1. Button 9 controls the on/off condition of the LEDs 8. The LEDs 8 can be replaced with LED chips, and can be lined up to display various text or figures in the transparent base 1.

The metal coil 12 is mounted in the transparent base 1. When radiowaves are present, the coil can generate electric power to supply the hanging brand; and with an IC chipset or MCU added, more efficient function can be achieved. The MCU is connected with the PCB board 3, picture layer 4, LCD sheet 5, solar sheet 6, LEDs 8, button 9 and storage battery 10.

Figure 2:
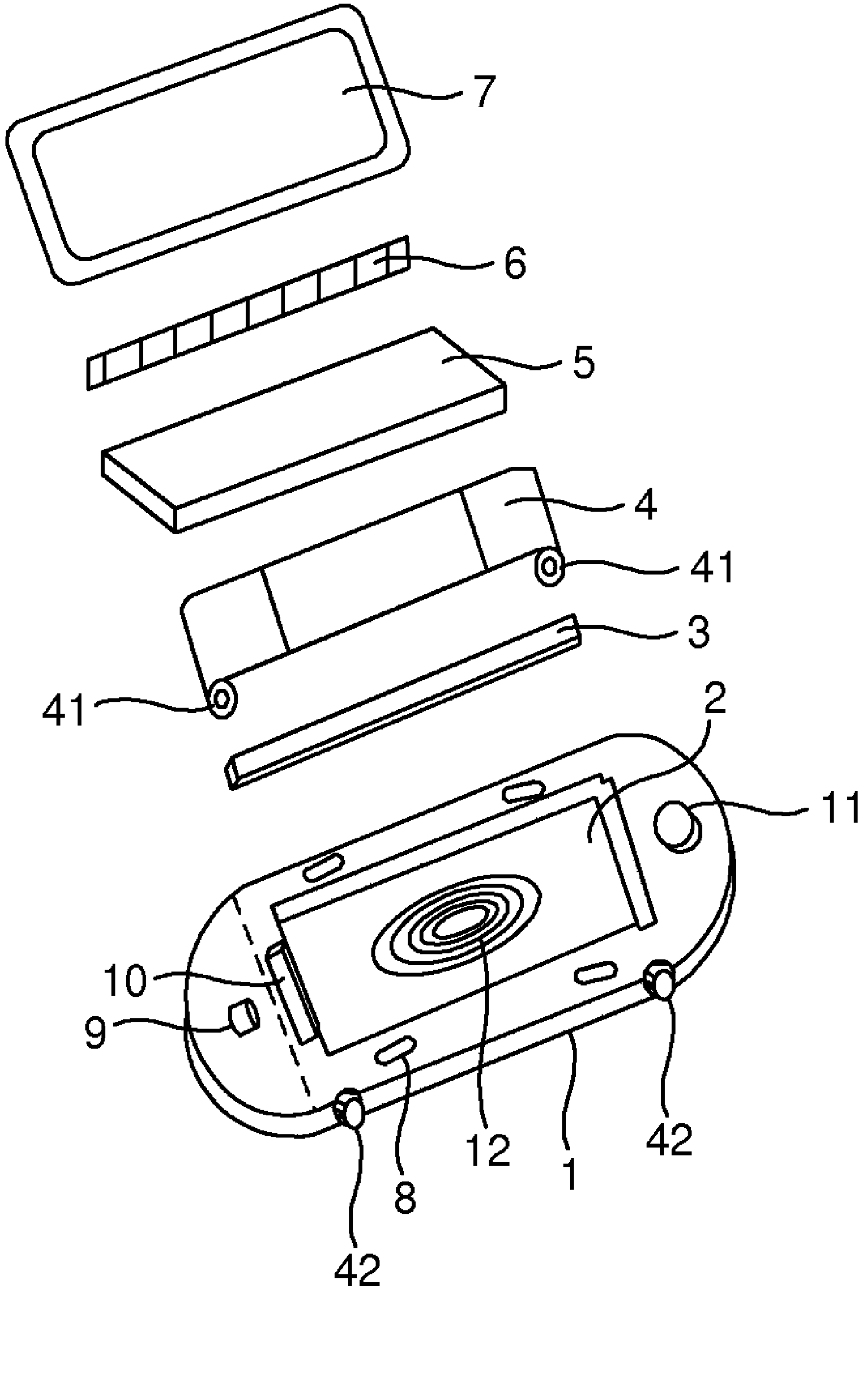
FIG. 2 is a structure chart of the other preferred invention embodiment.

There is shown in FIG. 2, the other embodiment of the said invention. Several sheets of transparent color film can be placed in the picture layer 4. The roller 41 is mounted at both sides of the picture layer 4. The film can page up and down by a motor inside or the rotating button 42 outside the transparent base 1. With the moving of the film, advertisement pictures can be displayed one by one, and at the same time, background music can be played by setup from the IC. This can be used in education, advertisement, propaganda or illustration.

The invention has a novel function and is easy for production. It has a wide range of uses, such as for a keychain, bag or case tag, mobile hanging devices, and it can even be embodied in the form of a fixed billboard located in densely populated areas.

While there have been shown and described what are at present considered to be the preferred embodiments of the invention, it will be apparent to those skilled in the art that various changes and modification can be made herein without departing from the scope of the invention as defined by the appended claims.

What is claimed is:

1. A solar energy driven LCD hanging-brand for advertising, the LCD hanging-brand comprising:

a transparent base (1), comprising a hanging hole (11);

a transparent scaling cover (7);

a groove (2) with a PCB board (3) inside the transparent base (1);

a picture layer (4) that holds one or more color transparent films, the color transparent films comprising one or more pictures;

a LCD sheet (5) operable to be divided into one or more parts, each part being configurable to be powered, for displaying one or more corresponding parts of the pictures comprised in the color transparent films;

a button (9) that controls LEDs (8), wherein the LEDs (8) illuminate the picture layer (4);

a solar sheet (6) that receives light and converts the light to electric power for supplying to the LCD hanging-brand;

a storage battery (10) that stores the electric power; and a metal coil (12) that generates electric power in the presence of radio waves, for supplying the LCD hanging-brand.

2. A solar energy driven LCD hanging-brand for advertising, the LCD hanging-brand comprising:

a transparent base (1) comprising a hanging hole (11);

a transparent scaling cover (7);

a groove (2) with a PCB board (3) inside the transparent base (1);

a picture layer (4) comprising one or more rollers (41) on both sides of the picture layer (4); and at least one transparent color film having one or more pictures, the transparent color film being rotatable using a motor inside the transparent base (1) or a rotating button (42) outside the transparent base (1), for displaying the pictures on the LCD hanging-brand;

a LCD sheet (5) operable to be divided into one or more parts, each part being configurable to be powered, for displaying one or more corresponding parts of the pictures comprised in the color transparent films;

a button (9) that controls the LEDs (8), wherein the LEDs (8) illuminate the picture layer (4);

a solar sheet (6) that receives light and converts the light to electric power for supplying to the LCD hanging-brand;

a storage battery (10) that stores the electric power; and a metal coil (12) that generates electric power in the presence of radio waves, for supplying the LCD hanging-brand.

3. The solar energy driven LCD hanging-brand for advertising of claim 1, wherein the LCD sheet (5) is transparent when the LCD hanging-brand is in the off state, wherein the one or more pictures on the picture layer (4) are visible through the LCD sheet (5) on the LCD hanging-brand being turned off.

* * * * *